B. Gilpatrick,
Saw-Set.

№ 15,007. Patented June 3, 1856.

Inventor
Benjamin Gilpatrick

UNITED STATES PATENT OFFICE.

BENJN. GILPATRICK, OF LOWELL, MASSACHUSETTS.

SAW-SET.

Specification of Letters Patent No. 15,007, dated June 3, 1856.

*To all whom it may concern:*

Figure 1:
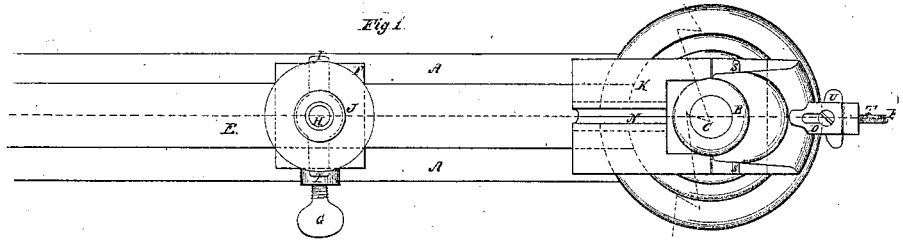
Figure 2:
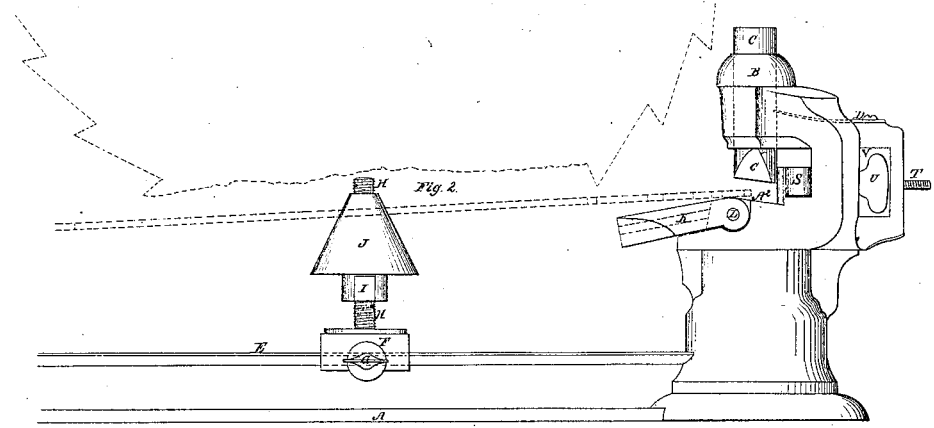
Figure 3:
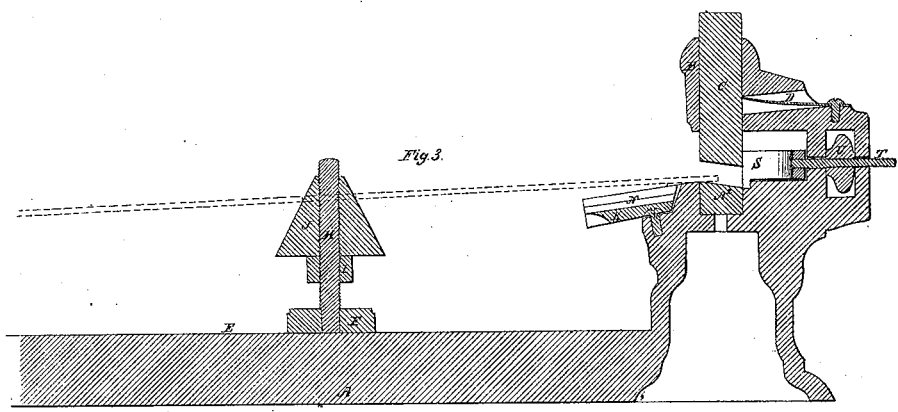
Figure 4:
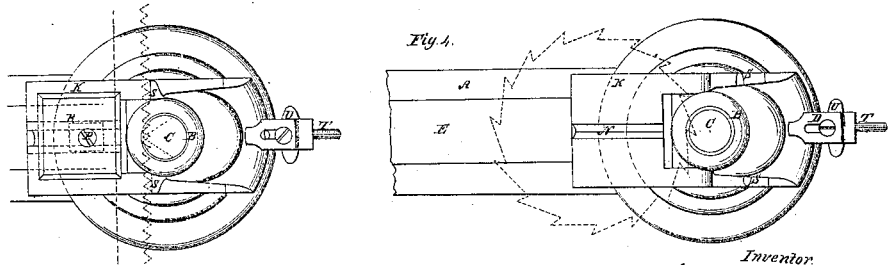

Be it known that I, BENJAMIN GILPATRICK, of Lowell, in the county of Middlesex and State of Massachusetts, have invented a new and useful Saw-Set; and I hereby declare that the following is a full, clear, and exact description of the construction and use of the same, when taken in connection with the accompanying drawings, and the references thereon, in which, Figure 1, denotes a plan, or top view, with the circular saw thereon. Fig. 2, denotes a side elevation of the same. Fig. 3, denotes a longitudinal and vertical section of the same on line A, B, Fig. 1. Fig. 4, is a plan of my saw set, with a small circular saw placed thereon for its teeth to be set. Fig. 5, denotes a plan of my saw set with a whip saw, or narrow saw placed thereon, for its teeth to be set.

The nature of my invention consists of a saw set which is hereinafter fully described, which is so constructed as to set the teeth of circular, hand, narrow, and all other saws, in common use, in the most perfect manner, and with the greatest convenience and despatch.

To enable persons skilled in the art to which my invention appertains, to construct and carry out the same, I will proceed to describe it as follows. I construct the main bed piece of cast iron seen at A, A, one end of it being projected upward as seen at B, sufficient to receive the steel setting punch C, which is so fitted to that portion of the bed marked B, that it can be easily moved upward, and held, and kept from turning by the spring D, and forced downward by the hammer of the operator, the lower end of the setting punch being beveled as seen in the drawings so as to fit the inclined plane and steel anvil A², the steel spring D is so fitted to the setting punch C, as seen in Fig. 3, that it effectually prevents it from turning.

I form a track seen at E, of a part of the bed piece A, which track receives an iron pedestal seen at F, so fitted that it may slide from end to end, of the track E. The pedestal F, is provided with a thumb screw seen at G for securing it in any desired position as will be necessary in setting circular saws. To the upper side of the pedestal F I firmly attach a wrought iron rod seen at H, which is threaded its entire length to receive the check nut I and the iron truncated cone J; this cone receives the various sizes of circular saws in ordinary use, and constitutes the guide for them while their teeth are being set, and by raising or lowering the cone J, it may fill any ordinary sized hole in the circular saw, so as to constitute its guide around which it revolves when the teeth are being set, and this cone also raises or lowers the saw so as to give more or less set to the teeth as desired, the check nut I securing the cone J in the desired position after it has been properly adjusted. The cone J, and pedestal F, to which it is attached, can be advanced toward, or receded from the setting punch C, on the track E, to the desired position so as to bring the saw teeth properly under the setting punch C, and then firmly secured by the thumb screw G.

In order to plainly show my method of setting very small circular saws see Fig. 4. I construct a swinging plate seen at K, which has its axis seen at L, and which may be raised or lowered to give more or less set to the teeth of the saws, by means of the screw M, Fig. 3, I form a slot seen at N, in the plate K, to receive a sliding nut O into which the screw P, passes to hold the bushing Q. This bushing constitutes the guide for very small circular saws by passing through their centers similar to the cone J, for large circular saws and this bushing can be moved toward, or from the setting punch C, by means of the sliding nut O, and slot N, and the screw P.

To set whip or narrow saws I construct a jaw seen at R, Fig. 5, which occupies the same position as the bushing Q, and is pressed down upon the narrow saw by the screw P, and sliding nut O, thereby holding the saw firmly upon the anvil A², the swinging plate K, can be raised more or less to impart a greater or less degree of set to the teeth by means of the screw M.

A guide is constructed as seen at S, which is moved backward or forward by the screw T, which is fastened to the guide S, and receives the nut U placed in the recess V this guide S, can be moved backward or forward the desired amount to allow the teeth of saws to project sufficiently under the setting punch as to set or bend down the saw teeth as desired.

Operation: To set hand saws, or other wide saws, the jaw R should be removed from the swinging plate K, the guide S should be properly placed by turning the nut U so as to allow the saw teeth to project sufficiently under the punch C to bend the teeth far enough toward the back of the saw; then the swinging plate K, can be elevated or depressed by the screw M, sufficient to impart the desired amount of set to the teeth; then place the saw upon the swinging plate K, letting the saw teeth project under the setting punch C until the points of the teeth strike against the guide S which has been previously adjusted; then place every other tooth under the setting punch C, at the same time giving it a smart blow with a hammer sufficient to properly bend the tooth. After this has been done to every other tooth of the saw it should be turned over and the others set in like manner, which completes the operation for setting hand, and other wide saws.

For setting narrow, or whip saws, I properly adjust the guide S, so as to let the teeth of the saw far enough under the setting punch C; then place the jaw R upon the back edge of the saw with the sliding nut O in the slot N; then turn down the screw P, so as to grip the back edge of the saw so as to prevent its canting up when the blow is given the setting punch C. Thus the narrow saw is held fast while each and every tooth is bent down, or set as desired.

For setting circular saws, the guide S should be moved back out of the way of the teeth; then the circular saw (if more than two or three inches in diameter) should be placed upon the truncated cone J, which should be raised or lowered to the desired elevation to impart the proper amount of set to the teeth; then the pedestal F, is moved so as to bring the saw teeth sufficiently under the setting punch C; then the operator gives every other tooth a blow from the setting punch C, by means of a hammer, until the saw is revolved entirely around in one direction; then the saw is turned over and revolved around, bending down every other tooth by the punch C, and hammer in the hands of the operator, while the other hand steadies the saw, which completes the operation.

To set very small circular saws, the bushing Q, is moved or slid into the proper position and thus secured by means of the sliding nut O, slot N, and the screw P; then the saw is placed upon this bushing Q, down upon the swinging plate K, after it has been raised, or lowered as desired, by the screw M; then the same operation is performed as in setting large circular saws which completes the whole operation.

Having thus described my invention what I claim therein as new and desire to secure by Letters Patent is—

The pedestal F, the screw H, attached thereto, and the check nut I, and truncated cone J, or their mechanical equivalents arranged and operated essentially in the manner and for the purposes set forth.

BENJAMIN GILPATRICK.

Witnesses:
GEO. W. F. BAKER,
E. W. SCOTT.